(12) United States Patent
Yadati et al.

(10) Patent No.: US 10,963,906 B2
(45) Date of Patent: Mar. 30, 2021

(54) METHOD AND SYSTEM FOR OPTIMIZING VALUE OF CONSUMER OFFERS

(71) Applicant: TRANSFORM SR BRANDS LLC, Hoffman Estates, IL (US)

(72) Inventors: Supraja Yadati, Cupertino, CA (US); Nikolay K. Karasev, Winfield, IL (US); Pankaj Singh, Hoffman Estates, IL (US)

(73) Assignee: Transform SR Brands LLC, Hoffman Estates, IL (US)

( * ) Notice: Subject to any disclaimer, the term of this patent is extended or adjusted under 35 U.S.C. 154(b) by 0 days.

(21) Appl. No.: 14/059,204

(22) Filed: Oct. 21, 2013

(65) Prior Publication Data

US 2015/0112789 A1 Apr. 23, 2015

(51) Int. Cl.
*G06Q 30/02* (2012.01)

(52) U.S. Cl.
CPC ..... *G06Q 30/0238* (2013.01); *G06Q 30/0239* (2013.01)

(58) Field of Classification Search
None
See application file for complete search history.

(56) References Cited

U.S. PATENT DOCUMENTS

| | | | | |
|---|---|---|---|---|
| 6,757,661 B1 * | 6/2004 | Blaser | | G06Q 30/02 705/14.54 |
| 2006/0020512 A1 * | 1/2006 | Lucas et al. | | 705/14 |
| 2007/0136109 A1 * | 6/2007 | Yager et al. | | 705/4 |
| 2010/0228630 A1 * | 9/2010 | Mikkelsen et al. | | 705/14.66 |
| 2012/0226565 A1 * | 9/2012 | Drozd | | 705/16 |
| 2012/0239515 A1 * | 9/2012 | Batra et al. | | 705/26.1 |
| 2012/0316992 A1 | 12/2012 | Oborne | | |
| 2013/0173372 A1 | 7/2013 | Misra et al. | | |
| 2013/0191217 A1 | 7/2013 | Letca et al. | | |
| 2013/0254304 A1 | 9/2013 | Van Nest et al. | | |
| 2014/0032300 A1 * | 1/2014 | Zhang et al. | | 705/14.35 |

FOREIGN PATENT DOCUMENTS

| | | |
|---|---|---|
| WO | 03/090145 A1 | 10/2003 |
| WO | 2013/049359 A1 | 4/2013 |

OTHER PUBLICATIONS

Knowledge-based Bundling of Smart Products on a Mobile Recommendation Agent Tobias Kowatsch, Wolfgang Maass, Andreas Filler & Sabine Janzen 7th International Conference on Mobile Business pp. 1-4 (Year: 2008).*
European Search Report for Application No. 14189717.3 dated Mar. 17, 2015 (7 pages).
Examinees Requisition for Application No. 2,868,196 dated Jan. 6, 2016 (4 pages).
Canadian Intellectual Property Office, Examiner Requisition in Application No. 2,868,196 dated Apr. 26, 2017 (6 pages).
European Summons to Attend Oral Proceedings dated Mar. 29, 2017 for European Patent Application No. EP 14189717.3.

(Continued)

*Primary Examiner* — Alexandru Cirnu
(74) *Attorney, Agent, or Firm* — McAndrews, Held & Malloy, Ltd.

(57) ABSTRACT

A method and system for determining an optimal combination of value offers from a plurality of value offers available to a consumer having selected a group of products or services for purchase.

27 Claims, 4 Drawing Sheets

(56) References Cited

OTHER PUBLICATIONS

Office Action for Application No. 14189717.3 dated Apr. 15, 2016 (8 pages).
Canadian Patent Office, Requisition in Application No. 2,868,196 dated Mar. 29, 2019 (8 pages).
Canadian Patent Office, Requisition dated Apr. 14, 2020 in Application No. 2,868,196 (7 pages).
Canadian Intellectual Property Office, Examiner Requisition in Application No. 2,868,196 dated Mar. 16, 2018 (6 pages).

* cited by examiner

METHOD AND SYSTEM FOR OPTIMIZING VALUE OF CONSUMER OFFERS

FIELD OF THE INVENTION

Certain embodiments of the present invention relate to systems and methods to identify offers on goods or services to be purchased by a consumer. More specifically, certain aspects of the present invention relate to systems and methods for determining optimal combinations of various forms of value such as coupons, discounts, and rewards that are available for use by a consumer considering purchase of one or more qualifying products and/or services.

BACKGROUND OF THE INVENTION

Manufacturers and vendors offer various forms of offers or incentives to those considering purchase of products and/or services. Coupons or offers in monetary (e.g., dollar) amounts or in percentage amounts of a discount, or rewards or rebates are made available through various channels such as, for example, print and electronic means. These forms of value to the consumer typically have rules for their use such as, for example, products to which they apply, a range of dates and/or times during which they may be used, and restrictions on how various forms of value to the consumer can be combined for a purchase.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for determining optimal combinations of offers in various forms of value such as coupons, discounts, and rewards that are available to a consumer considering purchase of one or more qualifying products, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Aspects of the present invention relate to systems and methods to identify offers on goods or services to be purchased by a consumer. More specifically, certain aspects of the present invention relate to systems and methods for determining optimal combinations of various forms of value such as coupons, discounts, and rewards that are available for use by a consumer considering purchase of one or more qualifying products and/or services.

The following description of example methods and apparatus is not intended to limit the scope of the description to the precise form or forms detailed herein. Instead the following description is intended to be illustrative so that others may follow its teachings.

In the following discussion, the terms "customer service agent" and "sales associate" may be used herein interchangeably to refer to an employee or other individual who provides product and/or sales related assistance to customers of a business. The sales associate or customer service agent may be, by way of example and not limitation, an expert, question and answer provider, merchandise associate, etc. The terms "customer," "consumer," "end-user," and "user" may be used herein interchangeably to refer to a potential or existing purchaser of products and/or services of a business.

The term "social network" may be used herein to refer to a network of family, friends, colleagues, and other personal contacts, or to an online community of such individuals who use a website or other technologies to communicate with each other, share information, resources, etc.

The terms "offer," "offer of value," and "value offer" may be used interchangeably herein to refer to something of value provided to a consumer contingent upon the purchase of one or more products and/or services. An offer may comprise any suitable form of value to the consumer known now or in the future such as, by way of example and not limitation, a percentage discount coupon, a cash value coupon, a gift card, a store sale in terms of discount percentage or monetary discount amount, merchant "points," credits, or rewards having an equivalent monetary value usable towards purchases or products and/or service, sweepstakes or contest entries, and buy-X-get-Y offers, where X and Y are natural numbers (i.e., positive integers) for products and/or services at a free or a discounted cost to the consumer.

As utilized herein, the terms "exemplary" or "example" means serving as a non-limiting example, instance, or illustration. As utilized herein, the term "e.g." introduces a list of one or more non-limiting examples, instances, or illustrations.

The disclosed methods and systems may be part of an overall shopping experience system created to enhance the consumer shopping event. In one example, the disclosed system may be integrated with the customer's reward system, the customer's social network (e.g., the customer can post their shopping activity conducted through the system to their social network), the customer's expert system, digital/mobile applications, shopping history, wish list, location, merchandise selections, or the like. However, the system disclosed may be fully and/or partially integrated with any suitable shopping system as desired, including those not mentioned and/or later designed.

Figure 1:
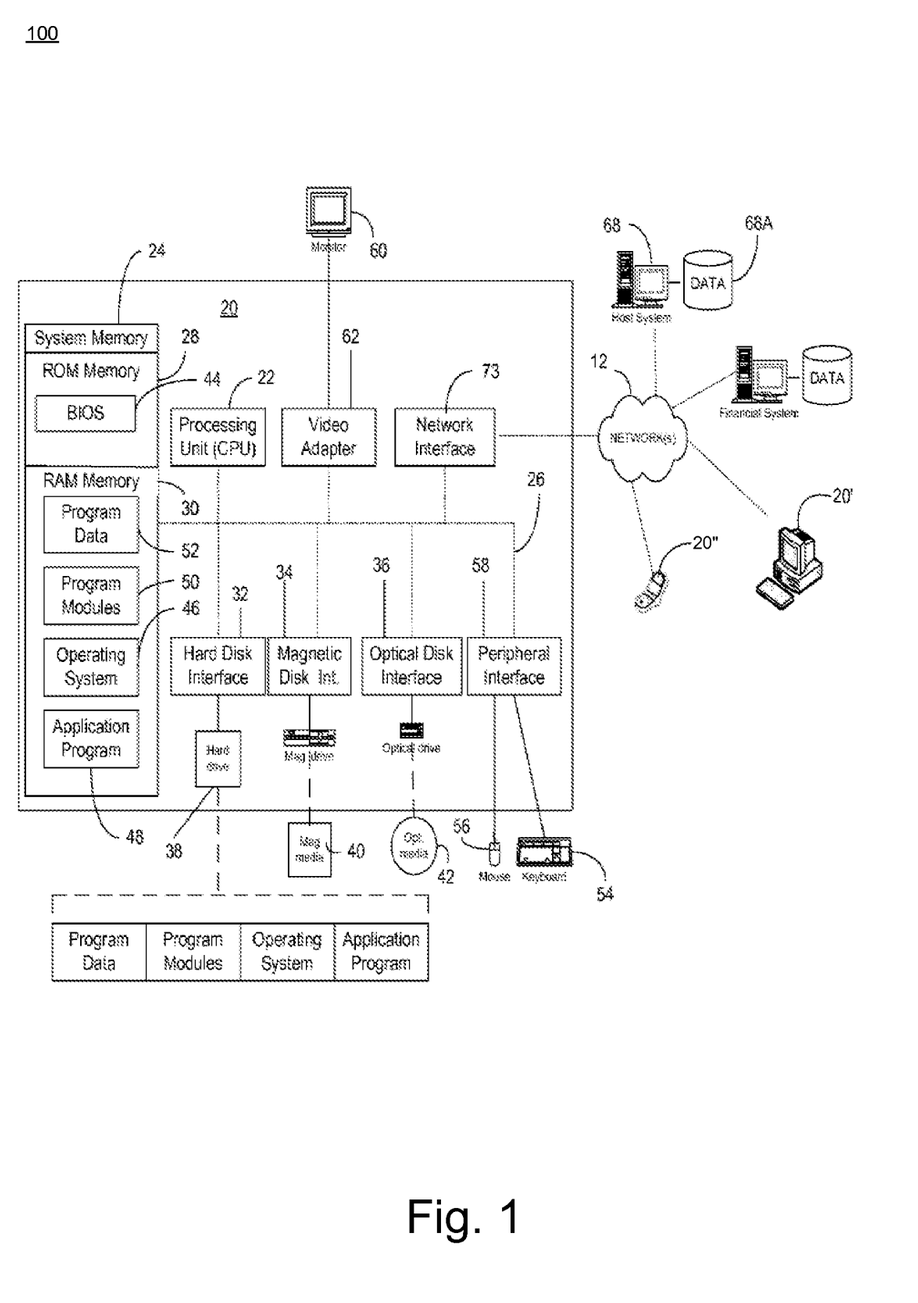
FIG. 1 is an illustration of exemplary computer network in which a representative embodiment of the present invention may be practiced.

FIG. 1 is an illustration of exemplary computer network 100 in which a representative embodiment of the present invention may be practiced. The following discloses various example systems and methods for, by way of example and not limitation, analyzing an assortment of offers to consumers to identify for a given consumer the best offers to use in purchasing items selected by the consumer. Referring now to FIG. 1, a processing device 20", illustrated in the exemplary form of a mobile communication device (e.g., a smart phone, a net book computer, a lap top computer, or a tablet computer), a processing device 20', illustrated in the exemplary form of a computer system (e.g., a point of sale terminal or a personal computer (PC)), and a processing device 20 illustrated in schematic form, are shown. Each of these devices 20, 20', 20" are provided with executable instructions to, for example, provide a means for a customer, e.g., a user, a customer or consumer, etc., or a sales associate, a customer service agent, and/or others to access a host system 68 and, among other things, be connected to an e-commerce web site, a content management system, an electronic publication system, a hosted social networking site, a user profile, a store directory, and/or a sales associate. Generally, the computer executable instructions reside in program modules which may include routines, programs, objects, components, data structures, etc. that perform particular tasks or implement particular abstract data types. Accordingly, the processing devices 20, 20', 20" illustrated in FIG. 1 may be embodied in any device having the ability to execute instructions such as, by way of example, a personal computer, mainframe computer, personal-digital assistant ("PDA"), cellular telephone, tablet, e-reader, smart phone, or the like. Furthermore, while described and illustrated in the context of a single processing device 20, 20', 20", the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, various forms of executable instructions may be downloaded to one or more of the computing devices and executed as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices are typically connected to the processing unit 22 by means of an interface 58 which, in turn, is coupled to the bus 26. Input devices may be connected to the processor 22 using interfaces such as, for example, a parallel port, game port, a FireWire (IEEE 1394) port, or a universal serial bus (USB) port. To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable devices.

As noted, the processing device 20 may also utilize logical connections to one or more remote processing devices, such as the host system 68 having associated data repository 68A. In this regard, while the host system 68 has been illustrated in the exemplary form of a computer, the host system 68 may, like processing device 20, be any type of device having processing capabilities. Again, the host system 68 need not be implemented as a single device but may be implemented in a manner such that the tasks performed by the host system 68 are distributed amongst a plurality of processing devices/databases located at different geographical locations and linked through a communication network. Additionally, the host system 68 may have logical connections to other third party systems via a network 12, such as, for example, the Internet, local area network (LAN), metropolitan area network (MAN), wide area network (WAN), cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, media content providers, document storage systems, etc.

For performing tasks as needed, the host system 68 may include many or all of the elements described above relative to the processing device 20. In addition, the host system 68 may generally include executable instructions for, among other things, coordinating storage and retrieval of documents such as advertisements, coupons, and offers, social network storage of a shopping list, receiving a location of a customer via a mobile device, maintaining maps and layouts of buildings and geographic areas, calculating directions or routes within buildings and geographic areas, receiving a request for a service call center connection from either a customer or a sales associate, routing the request via a distributed mobile video call center, and providing a service call infrastructure for providing the requestor with a distributed customer service experience.

Communications between the processing device 20 and the host system 68 may be exchanged via a further processing device, such as a network router (not shown), that is responsible for network routing of messages and information. Communications with the network router may be performed via a network interface component 73. Thus, within such a networked environment, e.g., the Internet, World Wide Web, LAN, cloud, or other like type of wired or wireless network, program modules depicted relative to the processing device 20, or portions thereof, may be stored in the non-transitory computer-readable memory storage device(s) of the host system 68 and processing devices 20, 20' and 20".

A representative embodiment of the present invention may be seen in a system or method for determining optimal combinations of various forms of value such as coupons, discounts, and rewards that are available for use by a consumer purchasing one or more products and/or services meeting the conditions for the offer. The conditions of an offer may be defined by a set of rules for the offer that may include a number of elements. Such elements may include, by way of example and not limitation, a status of the offer (e.g., "active," "inactive," "expired") that may be based on date and time, and product matching elements. Example product matching elements include, by way of example and not limitation, an "inclusion list" identifying a portion of a multi-level product hierarchy to which the offer applies, and/or an "exclusion list" identifying a portion of a multi-level product hierarchy to which the offer does not apply. For example, the rules for an offer may have an element that indicates the offer applies to all "Women's Apparel," or "Men's Suits," or all "Appliances," and may be in terms of classifications or categories to which the offer applies (e.g., a department/category/subcategory such as "Clothing/Women's Clothing/Tops").

Rules for an offer may also include elements identifying one or more price thresholds that must be met by the item(s) for purchase in order to qualify for a particular level of offer, and/or elements identifying product combinations that may be part of the offer (e.g., buy this product, get this other product at a discount). The rules of an offer may also include elements that define types of payment that qualify including, for example, that the consumer must use a certain credit card, that the consumer must pay in cash or check, or that the offer applies or does not apply to items with a particular type of pricing such as, by way of example and not limitation, a regular price, a promotional price, a discount price, a "good-while-supplies-last" price, and/or a clearance price)

In a representative embodiment of the present invention, a consumer wishing to purchase one or more items from a merchant may have available to them a number of different forms of value to use in completing a purchase transaction. For example, if the consumer is a member of a loyalty program of the merchant, the consumer may have accumulated what may be referred to herein as, by way of example and not limitation, "points," "rewards points," "loyalty points," "credits," proprietary currency units (e.g., "Geoffrey Dollars" at "ToysRUs"), and the like, that have been awarded based on, among other things, consumer purchases, interactions or activities defined by the merchant and/or their business partners, or the length of the consumer's relationship with the merchant and/or their business partners. Such "points," "credits," or proprietary currency units may have an equivalent actual monetary or "cash" value when used to pay for items selected for purchase such as, for example, an equivalency of 100 "points" or 1 proprietary currency unit to $1.00 of purchased goods or services.

The consumer may have been provided with various value offers in the form of, by way of example and not limitation, coupons that may be in either printed or electronic form. The value of a coupon may be defined in units of a currency, a percentage discount off of a purchase price, a certain number of loyalty program "points" that will be awarded, or a related product provided at a discount or at no charge, and/or any other suitable form of value. The offers of each of the coupons may be subject to a set of conditions such as, by way of example and not limitation, the time frame within which each coupon is valid (i.e., usable), what products may or may not be purchased using each coupon, what other forms of value may or may not be applied in combination with each coupon for a given purchase (e.g., store credit card, bank credit card, cash, personal check), a threshold amount of the purchase to be able to use the offer, and the like. The cash value or discount for a given offer may vary with the price of the items to which it applies and/or to the price of the item and/or the total price of the consumer transaction, and may be defined in terms of one or more thresholds. For example, the offer may provide $5 (or a certain first percentage) off of purchases less than a $50 threshold, and $10 (or a certain second percentage) off of purchases above the $50 threshold but less than a second threshold of $100. Rules or conditions involving any number of thresholds may be applied, without departing from the scope of the present invention.

In addition, a merchant and/or the partners of a merchant may have an advertised or unadvertised sale (e.g., what may be referred to herein as a "store deal" or "store sale") that affords a consumer the opportunity to purchase, at a discounted price or with special features or accessories, one or more items of interest to the consumer. Availability of the sale or promotional price or discount may be subject to a set of conditions (i.e., rules) defining, by way of example and not limitation, the time period when the sale price or discount applies, what products are included in the sale, the method of payment that is to be used to qualify for the sale price or discount, whether loyalty program "points" may be used for payment, whether other offers such as coupons may apply to items having a sale or promotional price, and various other conditions. In addition, rules or conditions of the merchant, or of any offer, may limit the number of offers that may be applied to or combined on a single product, or used in a single consumer transaction involving multiple products. Rules or conditions may also dictate the order in which two or more offers (e.g., cash value and percentage discount offers) are applied to a particular product or transaction.

A value offer to the consumer may also be in the form of future benefits such as, by way of example and not limitation, a coupon that provides a cash value, a discount percentage, and/or a number of loyalty program "points" usable for a future purchase from the merchant and/or a partner business. In a representative embodiment of the present invention, the dollar value of present and future loyalty point discounts may be treated the same, and may be in the form of a monetary or "dollar off" discount, and only monetary value (e.g., dollar value) may be considered as the criteria, and present or future may not have a preferred priority in usage or application of such "points" or "credits". However, in an alternative representative embodiment of the present invention, business rules may be configured to define present or future benefits as higher or lower priority, as desired. In a representative embodiment of the present invention, loyalty "points," "credits," proprietary currency, and the like may be awarded to a consumer for future use after all offers have been applied to the purchase of the selected products and/or services.

As can be appreciated, the individual values of each of the large number of offers that may be available to a consumer, along with the various rules or conditions that may govern the use of each offer, may create a very complex decision process for the consumer to arrive at the best combination of offers to use, from those available to them for any particular set of products being considered for purchase. The rules or conditions for any given offer may permit the offer to be applied to the purchase of a product in combination with one or more other offers. Such an offer may be referred to herein as being "stackable," and the combining of offers on a given product may be referred to herein as "stacking." A representative embodiment of the present invention may be employed to provide the consumer with information that identifies, for a given set of offers available to the consumer and a given set of products selected by the consumer, the combination of offers that provides the best value to the consumer, thereby allowing the consumer to receive the greatest benefit (i.e., "best value") for the given set of products of their selection.

It will be appreciated that the value of an offer to the consumer depends upon the nature of the offer. That is, the actual value realizable by the consumer for any given offer depends on the form of the offer, and any rules or conditions that apply to its use. For example, for offers defined in terms of a percentage discount, the value of a given offer when purchasing a particular item may be define herein as the price of the item in units of a currency (e.g., U.S. dollars) after any discounts of prior applied offers have been deducted, multiplied by the percentage discount of the given offer. For percentage discount offers that are "stacked" as part of a particular combination, the discounts of each of the stacked offers may be applied to the item price that results after the prior offer in the stacked offer is applied.

For offers defined as having a cash value (i.e., defined in terms of units of a currency, e.g., U.S. dollars), the value of a given offer may be defined herein as the cash value of the offer. In such a situation, the price of the item after application of the offer may be easily calculated as the price of the item before application of the offer, minus the cash value of the offer.

For offers defined in term of "points," the value of a given offer may be defined herein as the value of the "points" of the given offer, expressed in terms of an equivalent currency or a monetary or cash value of the "points."

For offers that provide free product with the purchase of a selected product, the value of the offer may be defined herein as the selling price of the free product in units of a currency.

Figure 2:
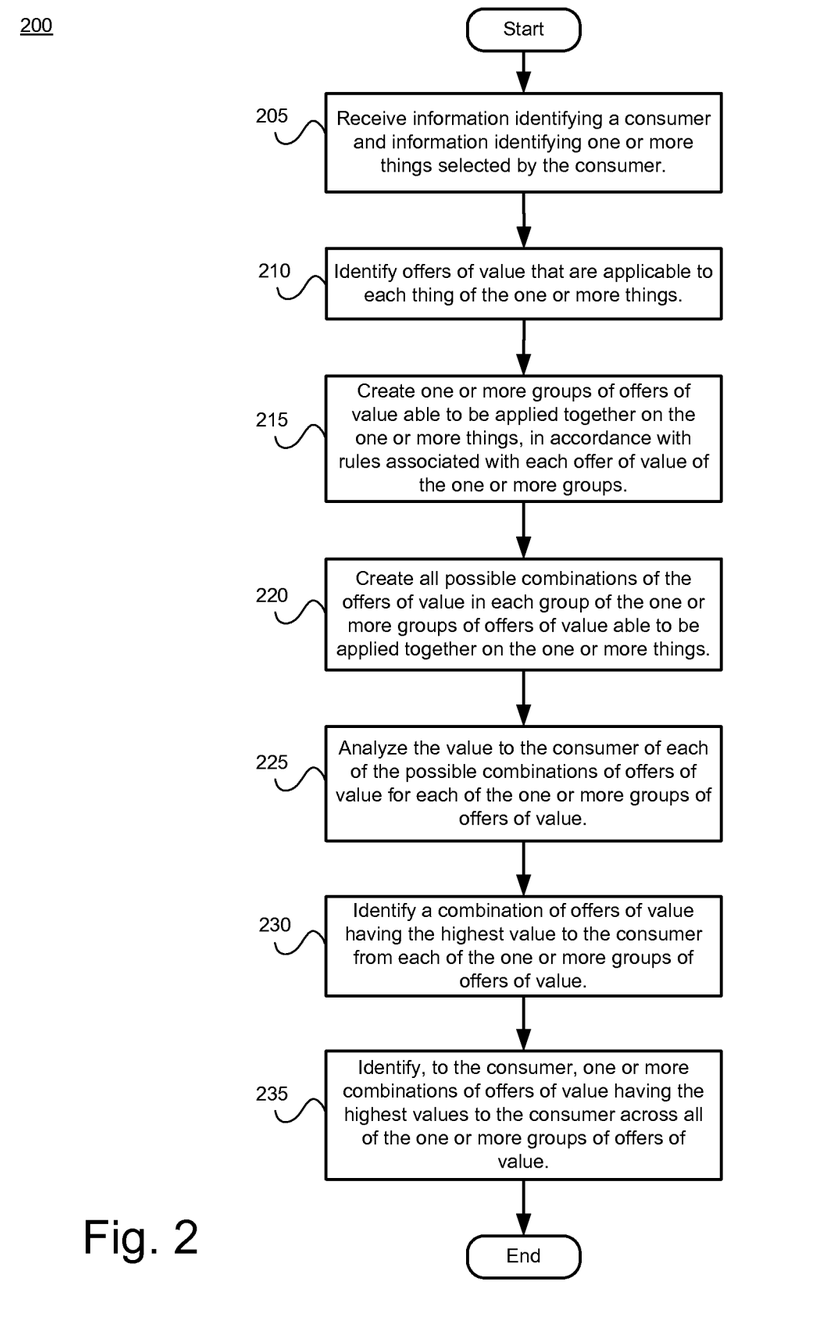
FIG. 2 show a high-level flowchart of an exemplary process of determining a combination of offers that provides the best value to a consumer in the purchase of a selection of one or more items, in accordance with a representative embodiment of the present invention.

FIG. 2 show a high-level flowchart 200 of an exemplary process of determining a combination of offers that provides the best value to a consumer in the purchase of a selection of one or more items, in accordance with a representative embodiment of the present invention. The process of FIG. 2 may, for example, be performed by any of the elements of FIG. 1 capable of performing the calculations and decisions shown in FIG. 2. Examples of such elements include, by way of illustration and not limitation, the host system 68, any of the processing devices 20, 20', 20", and any other suitable system or element such as, for example, the financial system of FIG. 1.

The process of FIG. 2 may, for example, be initiated when a consumer, in anticipation of purchasing one or more selected items and having one or more offers to apply, wishes to determine the amount that they will pay to purchase the selected items. This may occur, by way of example and not limitation, at a retail point of sale when the consumer arrives at a checkout counter, in an online environment when shopping for the selected items using a web browser connected to a merchant web portal via the Internet, or when using their smart phone or a consumer kiosk while shopping in a brick-and-mortar location of a merchant.

In accordance with a representative embodiment of the present invention, the process begins at block 205, where a system such as host system 68 of FIG. 1 receives information identifying a consumer and information identifying one or more things selected by the consumer. Such information may be received via, for example, a point-of-sale terminal in a store, a web browser running on a personal computer connected to the Internet, or a user-installed application or "app" running on a handheld mobile device of a user. Next, the method illustrated by FIG. 2 may, at block 210, cause a system to identify offers of value that are applicable to each thing of the one or more things. The system may identify any offers that are applicable to items selected for purchase by the consumer. The host system 68 may, for example, retrieve information about the offers available to the consumer from data maintained by the host system 68, from data maintained on a user device (e.g., a smart phone, a net book, a laptop computer, a desktop computer, a tablet computer), or from data stored by another suitable and accessible source such as, for example, the data repository 68A of FIG. 1.

Next, at block 215, the system performing the process of FIG. 2 may create one or more groups of offers of value able to be applied together on the one or more things. The application of such offers may be in accordance with rules associated with each offer of value of the one or more groups. The system may group the offers that can be applied together to create a set of what may be referred to herein as "buckets," where each bucket contains a group of "stackable" offers. Additional information is provided below.

The system performing the process may then, at block 220, create all possible combinations of the offers of value in each group of the one or more groups of offers of value able to be applied together on the one or more things. In this manner, a representative embodiment of the present invention may create all possible combinations of the stackable offers inside of each bucket.

At block 225, the process of FIG. 2 may analyze the value to the consumer of each of the possible combinations of offers of value for each of the one or more groups of offers of value. In performing these actions, the system calculates the value to the consumer of each offer combination in each bucket.

Next, at block 230, the system performing the process of FIG. 2 may identify a combination of offers of value having the highest value to the consumer from each of the one or more groups of offers of value. In this manner, the system selects, from each bucket, the offer combination that has the best value to the consumer.

Finally, at block 235, the process of FIG. 2 may identify, to the consumer, one or more combinations of offers of value having the highest values to the consumer across all of the one or more groups of offers of value. This results in the system selecting, from the best offer combinations of each of the buckets in the set of buckets, the offer combinations having the best value to the consumer across all buckets.

The following example is offered by way of illustration and not limitation. Let us assume that John Doe has selected two products, P1 and P2, for purchase, at a point-of-sale terminal of a merchant, and that John has four offers available, C1, C2, C3 and C4, that may apply to the selected products, P1 and P2. Information about John's product selections and offers may be received by a representative embodiment of the present invention as at block 205 of FIG. 2. The rules for offers C1, C2, C3, and C4 show that C1 and C3 cannot be stacked, and that C2 can be stacked with C1 or C3. A representative embodiment of the present invention may perform the actions corresponding to block 210 of FIG. 2 by identifying the available offers, C1, C2, C3, and C4, that are applicable to the products selected for purchase, P1 and P2. For the purposes of this example, let us assume that offers C1, C2, and C3 may be applied to product P1, that only offer C1 may be applied to product P2, and that offer C4 cannot be applied to either product P1 or P2. A representative embodiment of the present invention may represent this in the form of a list of offers in association with the products to which the offers may be applied. This may be represented as a list comprising each offer and the associated products to which the offer applies as, by way of example and not limitation, using the notation C1(P1, P2), C2(P1), and C3(P1).

A representative embodiment of the present invention may then perform the actions of block 215 of FIG. 2, by creating groups, sets, or collections of offers that may be applied together towards the purchase of a particular product, using the list of offers and associated products. Such offers may be referred to herein as "stackable offers," and each such group, set, or collection may be referred to herein as a "bucket." For example, a check may be made whether a first offer, C1, is stackable with a second offer, C2. In the present example, offers C1 and C2 are stackable for product P1, so offers C1 and C2 are placed in a first group or "bucket," B1, of offers that are stackable on product P1. A check is then made whether the first offer, C1, is stackable with a third offer, C3. In the present example, offers C1 and C3 cannot be stacked. Since all possible combinations of offer C1 with another offer have been checked, the example moves on to check for possible combinations of offer C2 with offers not yet checked. Since the ability to combine office C2 with C1 has already been checked, a check is made whether offer C2 is stackable with offer C3. In this example, offer C2 is stackable with offer C3, so offers C2 and C3 are placed in a second group or bucket, B2, of offers that are stackable. The ability to combine or "stack" all of the offers applicable to products P1 and P2 (i.e., offers C1, C2, and C3) have now been checked, and two groups or buckets of stackable offers, B1 and B2, have been created.

Next, a representative embodiment of the present invention may perform the actions of block 220 of FIG. 2 by creating a list of all possible combinations of offers in each of the groups or "buckets", B1 and B2. For example, bucket B1 contains offers C1 and C2. Two possible ordered combinations of offers C1 and C2 are possible, namely, offer combinations (C1, C2) and (C2, C1). Bucket B2 contains offers C2 and C3, from which two ordered offer combinations, (C2, C3) and (C3, C2) may be formed.

A representative embodiment of the present invention may then, as part of block 220, determine whether the number of offers in a bucket is less than or equal to a certain maximum number of offers. The maximum number of offers may correspond to, for example, the maximum number of offers that is able to be accommodated by the point of sale system for the sales checkout channel through which the consumer is purchasing the selected products. If the number of offers in a bucket is less than or equal to a certain maximum number of offers, for example, five, the analysis of the offers, and therefore the calculation of the price of the selected items may use what is referred to herein as "factorial logic," in the following way. Using "factorial logic", the discounted prices of the selected products may be calculated by applying the offers according to the order of each offer combination in the list of all possible offer combinations in each bucket. For example, with respect to the first combination of offers in bucket B1, i.e., (C1, C2), the discounted prices of the products P1 and P2 may be calculated by first applying offer C1 to products P1 and P2, and then applying offer C2 to the discounted price of P1. In the case of the second combination of offers in bucket B1, i.e., (C2, C1), the discounted prices of the products P1 and P2 may be calculated by first applying offer C2 to product P1, and then applying offer C1 to the discounted price of P1 and the price of P2. In a similar manner, the discounted price of product P1 may be calculated for the combinations of offers in bucket B2. For the first combination of offers in bucket B2, i.e., (C2, C3), the discounted prices of product P1 may be calculated by first applying offer C2 to product P1, and then applying offer C3 to the discounted price of P1. In the case of the second combination of offers in bucket B2, i.e., (C3, C2), the discounted price of the product P1 may be calculated by first applying offer C3 to product P1, and then applying offer C2 to the discounted price of P1. The value of each offer combination in a bucket may be defined as the difference between the total price of all products (e.g., P1, P2) before a particular offer combination of a bucket is applied, and the total price of all products after the particular offer combination of the bucket is applied.

A representative embodiment of the present invention may, however, operate in a different manner if the number of offers in a combination is greater than the certain maximum number of offers mentioned above. If the number of offers in a combination is greater than the certain maximum number of offers (e.g., continuing from the above example using a threshold of five offers), the calculation of the price of the selected items for that combination of offers may use an alternate approach, which may be referred to herein as a "most probable case check." In such a representative embodiment of the present invention, the various offers in a combination may each be classified as either what may be referred to herein as a "dollar off equivalent" offer or what may be referred to herein as a "percentage off equivalent" offer. For example, a coupon good for $5 towards purchase of a particular item is defined herein as a "dollar off equivalent" offer whose value is $5. A coupon good for 5,000 loyalty "points," where 1,000 loyalty "points" may be used as $1 in the purchase of a product, may also be defined herein as a "dollar off equivalent" offer. A coupon offering a discount of %10 off of the price of a product may be defined herein as a "percentage off equivalent" offer. For purposes of assigning value to such offers, the example of a coupon good for $5 towards a product purchase, and the example of a coupon good for 5,000 "points" usable as $5 for a purchase, are both examples of "dollar off equivalent" offers having a value of $5, while a coupon offering %10 off of a purchase of $50 of products and/or services, which is an example of a "percentage off equivalent" offer, also has a value of $5. The alternate approach used for situations where an offer combination contains greater than a certain maximum or threshold number of offers will now be described.

To illustrate, the "most probable case check" approach referred to above may begin by separating the offers in an offer combination into "dollar off equivalent" offers, which are placed in a first list, and "percentage off equivalent" offers, which are placed in a second list. Next, an associated savings resulting from application of each "dollar off equivalent" offer in the offer combination may be computed, for those selected products to which the offer is applicable. In a similar fashion, an associated savings resulting from application of each "percentage off equivalent" offer in the offer combination may be computed, for those selected products to which the offer is applicable.

In a representative embodiment of the present invention, the "most probable case check" approach may continue by arranging the list of "dollar off equivalent" offers in decreasing order of savings of the offers in the list, and arranging the list of "percentage off equivalent" offers in decreasing order of savings of the offers in the list. A determination may then be made whether the total number of offers in the two lists is greater than the certain maximum number of offers able to be supported by the sales channel checkout. The sales channel checkout may include, by way of example and not limitation, customer checkout at an attended or self-service point of sales (POS) terminal in a "brick-and-mortar" business location, customer checkout via a web browser in communication with a web portal used for Internet purchases, or customer checkout via a terminal used by a customer sales associate taking customer orders on a telephone order line.

If it is determined that the total number of offers in the "dollar off equivalent" list and the "percentage off equivalent" lists is greater than the certain maximum number of offers able to be handled by the sales channel checkout being used for the customer purchase, the "most probable case check" approach may compare the savings associated with the last offer (i.e., the offer having the lowest savings) in the "dollar off equivalent" list and the "percentage off equivalent" list, and may remove from the respective list, the offer having the lower savings. The "most probable case check" approach may perform the comparison and removal of offers having the least associated savings, until the total number of offers in the "dollar off equivalent" and the "percentage off equivalent" lists is equal to the maximum number of offers able to be handled by the sales channel checkout being used for the customer purchase. The "most probable case check" approach may then form a combined list of offers for the offer combination being considered, using the offers remaining in the "percentage off equivalent" list and the "dollar off equivalent" list, in that order, compute a savings for the combined list of offers for the items selected for purchase, associate the computed savings with the combined list of offers, and place the offer combination and associated savings in the bucket.

As described above, a representative embodiment of the present invention may perform the actions of block 225 of FIG. 2, by analyzing the value of all of the offer combinations in each of the buckets to determine the savings associated with each offer combination, as described above, and may, as represented at block 230 of FIG. 2, identify one or more offer combinations in each bucket that provide the best value (i.e., the offer combination(s) providing the largest discount) to the consumer.

Once the savings resulting from each of the offer combinations of each of the buckets have been analyzed, and the offer combination having the best value of all offer combinations in each bucket has been identified, a representative embodiment of the present invention may then, as represented by block 235 of FIG. 2, identify the bucket with the offer combination having the best value for the consumer of all buckets of offer combinations, and therefore may identify the offer combination in that bucket having the best value, as the offer combination having the best value of all offer combinations in all of the buckets.

A representative embodiment of the present invention may use a number of optimization techniques to improve the performance of the service implementing the above-described algorithm. For example, a system implementing the algorithms detailed above may build a full list of all applicable offers for a given product and may cache such information and provide such information on demand (e.g., when creating a list of offers to be applied to a given product/service selected for purchase.) A representative embodiment of the present invention may do this in any of several ways.

In a first exemplary approach, a system in accordance with the present invention may access the subset of all possible offers that actually belong to the consumer, and may check the applicability of those offers against the products or services selected for purchase by the consumer. In such an approach, each of the products and services selected for purchase by the consumer (e.g., in their "shopping cart") may be checked to determine the applicability of each of the offers to a particular product or service selected for purchase.

In a second exemplary approach, a system in accordance with the present invention may access all possible offers that are "live" at the sales channel checkout (e.g., currently available to the consumer through the sales channel they are using, e.g., in-store, Internet purchase, telephone order sales channels). The system may then check the applicability of each of those offers to each of the products or services selected for purchase by the consumer (e.g., in their "shopping cart"), and may save in a "master list" (e.g., a cache) identifying each product or service selected by the consumer, information identifying all offers applicable to that product or service (e.g., a "universe" of offers). A filter may then be applied to this "master list" of products/services and associated applicable offers to get those user-specific offers that apply to each of the products or services selected for purchase by the consumer. In this way, the first time a request is made to identify offers applicable to a particular product or service, the universe of all offers for that particular product or service that apply to that sales channel is retrieved and run against the particular product or service. Once all possible offers that apply to a particular product or service and sales channel have been identified, the offers available to a particular consumer for that particular product or service are determined by intersection.

In a representative embodiment of the present invention, one of the two above-described approaches may be selected based on, for example, the number of total offers available on the sales channel of interest, and performance of the system that determines the offers available for application to consumer purchases. For example, when employing the second approach described above, the system that determines applicable offers may initially experience a high load when large numbers of non-cached product/service requests cause the algorithm to evaluate offers for each product or service. However, in a representative embodiment of the present invention, subsequent requests for information about offers for a given product or service may be available in the information saved from prior requests and cached, which then results in improved or optimal performance. In a representative embodiment of the present invention, the first approach described above may be adopted if it is found that the caching and filtering of the second approach does not provide significant improvement in response times compared to real time evaluation. It should be noted that while the above describes an example approach that may check applicability of offers in a linear, sequential, or one-by-one manner, other techniques including, by way of example and not limitation, parallel processing of subsets of the universe of offers mentioned above, and recursion techniques, may also be employed, without departing from the spirit and scope of the present invention.

A representative embodiment of the present invention may also employ an optimization technique to reduce the number of offers to be considered. For example, the order in which the rules of an offer are applied to a product or service may be optimized so as to apply the filters that eliminate the greatest number of offers at each successive step in the filtering process. In some representative embodiments of the present invention, the optimal order may be derived by examining the size of the data sets and the historical impact of product or service attribute changes upon a reduction in the number of offers to be considered.

A representative embodiment of the present invention may employ a particular order for applying rules of offers to optimize performance of algorithms for determining applicability of offers to products or services. For example, a system in accordance with the present invention may first determine whether the rules of an offer indicate that the offer applies to the sales channel(s) through which the consumer is making their purchase. That is, a check may be made whether the offer applies to the particular sales channel such as, for example, in-store, Internet, or telephone, and if in-store, whether the offer applies to the particular store location at which the consumer is making the purchase. Next, the system may check whether the date and time of the consumer transaction are within the start and end times of the offer. The system may then determine whether the offer applies to a product or service based on product hierarchy inclusion/exclusion rules for the offer. Next, the system may determine, if the consumer is making their purchase at a physical store location, whether the offer rules related to store format (e.g., automotive, store in a mall, a location containing a particular line of goods (e.g., a "hard-line store")) are met. Finally, an exemplary system may determine whether the rules relating to applicability of the offer to items having a particular status (e.g., items on "clearance" and/or items whose prices have been "marked-down") have been met. It should be noted that the order of application of various filter of this example is for illustrative purposes only, and that methods of filtering that apply other filters and other orders of filtering of offers including, for example, methods that dynamically select filters to be applied and/or dynamically re-order the application of a set of filters may be employed without departing from the spirit and scope of the present invention. Some filtering aspects such as, by way of example and not limitation, the time period, and the channel via which the consumer transaction is taking place, may be mandatory filters applicable to all products and/or services, while other filtering aspects may not apply to particular products and/or services, and therefore may not be defined for a particular offer. By evaluating the applicability of offers according to a particular order of criteria, as demonstrated by the above example, a representative embodiment of the present invention may reduce the number of offers to be considered, thereby optimizing the resources needed to handle the volume of offers to be processed.

A representative embodiment of the present invention may also employ an optimization technique that caches offers for frequently visited sales channels. For example, offers that apply to sales channels that have higher traffic may be cached in memory to reduce the amount of time spent to retrieve offer information (e.g., offer rules, terms & conditions) for analysis of applicability of offers and offer combinations to products and services selected by consumers. A representative embodiment of the present invention may also cache product or service attributes for the most frequently purchased products or services, to reduce the time and resources used in evaluating applicability and consumer savings for various offers and offer combinations.

Figure 3:
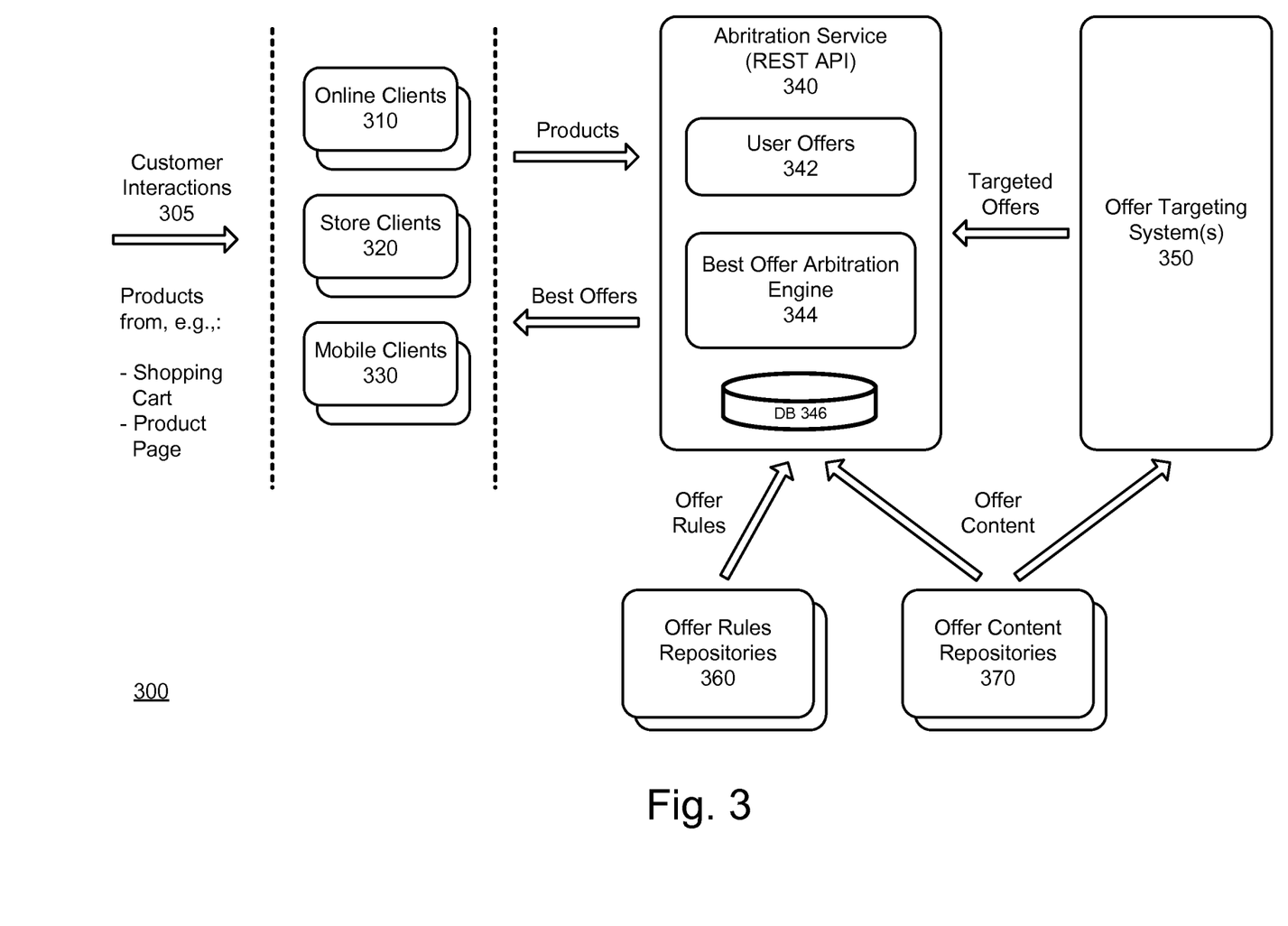
FIG. 3 shows a block diagram of an exemplary architecture illustrating the functionality and information flow of a system for optimizing value of consumer offers, in accordance with a representative embodiment of the present invention.

FIG. 3 shows a block diagram of an exemplary architecture 300 illustrating the functionality and information flow of a system for optimizing value of consumer offers, in accordance with a representative embodiment of the present invention. The functionality and information flow illustrated in FIG. 3 may, for example, be embodied in hardware and software of a system such as the computer system 100 of FIG. 1. As is shown in FIG. 3, the elements of such a system may receive information from a customer that initiates customer interactions 305 via one or more of an online client 310, a store client 320, and a mobile client 330. The online client 310 may comprise, for example, a web browser running on a desktop, computer such as the processing device 20" of FIG. 1. The store client 320 may comprise, by way of example and not limitation, suitable firmware, software, hardware, and/or logic of a point-of-sale terminal, a customer kiosk, or a customer service agent terminal such as the processing device 20' shown in FIG. 1. The mobile client 330 may comprise an end-user (e.g., the customer) downloadable application comprising one or more of suitable firmware, software, hardware, and/or logic for a smart phone, a tablet computer, a laptop computer, a net book computer, or notebook computer which may correspond to, for example, the processing device 20" of FIG. 1. The customer interactions 305 may involve one or more products and/or services of interest to or selected for purchase by the customer, and may be identified in, by way of example and not limitation, an electronic shopping cart of the customer, or on a product page being viewed by the customer on web site of a merchant.

Information about products selected by the customer and identified in customer interactions 305 may then be passed to an arbitration service 340. The arbitration service 340 of the example of FIG. 3 may reside on a computing system such as the host system 68 of FIG. 1, and may comprise, among other things, a collection of user offers 342, a best offer arbitration engine 344, and a database 346. The arbitration service 340 may communicate with various devices of the architecture 300 using, for example, a application programming interface (API) that is a REST API. That is, the API may use a protocol that is a representational state transfer (REST) protocol.

The collection of user offers 342 may include, by way of example and not limitation, information representing any of a number of different forms of offers that have been provided to the customers of the merchant operating or sponsoring the system of arbitration service 340, examples of which have been previously described above with respect to FIG. 2. In a representative embodiment of the present invention, the arbitration engine 344 may perform the various actions and analysis of the method of optimizing the value of combined consumer offers, as described above with respect to FIG. 2. Such analysis may use information identifying products selected by the customer and received by the arbitration engine 344 from the customer interactions 305 that may comprise, for example, online product selection, in-store product selection at a point-of-sale terminal or kiosk, or product selection via a downloadable mobile application or "app" on a user device, or an Internet client present on a smart phone, a tablet computer, or a laptop computer, among other possible devices.

The arbitration service 340 may receive offers targeted for various consumers from offer targeting system(s) 350, which may identify offers to be made available to particular customers, as opposed to offers made available to a mass market using broadcast media such as radio, television, or generally available print media such as magazines and newspapers. Offer rules, such as those previously described above, which may be used to govern applicability of various offers to products and/or services that may be selected by a consumer, may be stored in an offer rules repository such as, for example, the offer rules repositories 360, which may, for example, be located in a data repository such as the data repository 68A of FIG. 1 or at any other suitable location accessible by a system such as the host system 68. The offers of value sent to the consumer may include offer content that resides in a data repository such as, for example, the offer content repositories 370, which may, for example, correspond to the data repository 68A of FIG. 1. The arbitration service 340 may, for example, comprise software, hardware, and or logic suitable to perform the actions of the method of FIG. 2, described in detail above. The arbitration service 340 then determines results comprising the one or more offers or offer combinations that provide the customer with the best value (i.e., the greatest discount from the total price of the products and/or services selected for purchase by the customer. The database 346 may comprise, by way of example and not limitation, a "MySQL" or other suitable database that may be used to store various data including, for example, rules, offers, consumer information, data structures, and program operating parameters used and/or produced by the arbitration engine 344 and/or received from, for example, one or more other systems, in formats most suitable for efficient processing by the best offer arbitration engine 344. For example, offer rules from two or more business enterprises that share the arbitration service 340 may be converted to a common form most efficiently processed by the arbitration engine 344, to enable the arbitration engine 344 to provide the two or more business enterprises optimal performance in delivering to each consumer the best value offers identified by the arbitration service 340.

The offer targeting system 350, which may correspond to various elements of the computing system 100 such as, for example, the host system 68, may direct various types of offers described above to consumers based on, for example, information identifying the consumer, and offer content describing various offers of value that may be distributed. Targeted offers produced by offer targeting system 350 may comprise various forms of offers described above (e.g., percentage discount or cash value coupons, gift cards, or a buy one product and get a second product at a percentage discount or at a cash value discount).

The offer rules repositories 360 may maintain the rules of the various offers of value such as those rules described above, and may enable the arbitration service 340 to access details of rules for each of the offers being considered in the analysis of those offers available to the consumer for the purchase of various items selected by the consumer.

The offer content repositories 370 may maintain various forms of content such as, by way of illustration and not limitation, representations of information describing the offer, pictures and/or graphics, and any other suitable information related to the offers to be made available to the consumer.

Figure 4:
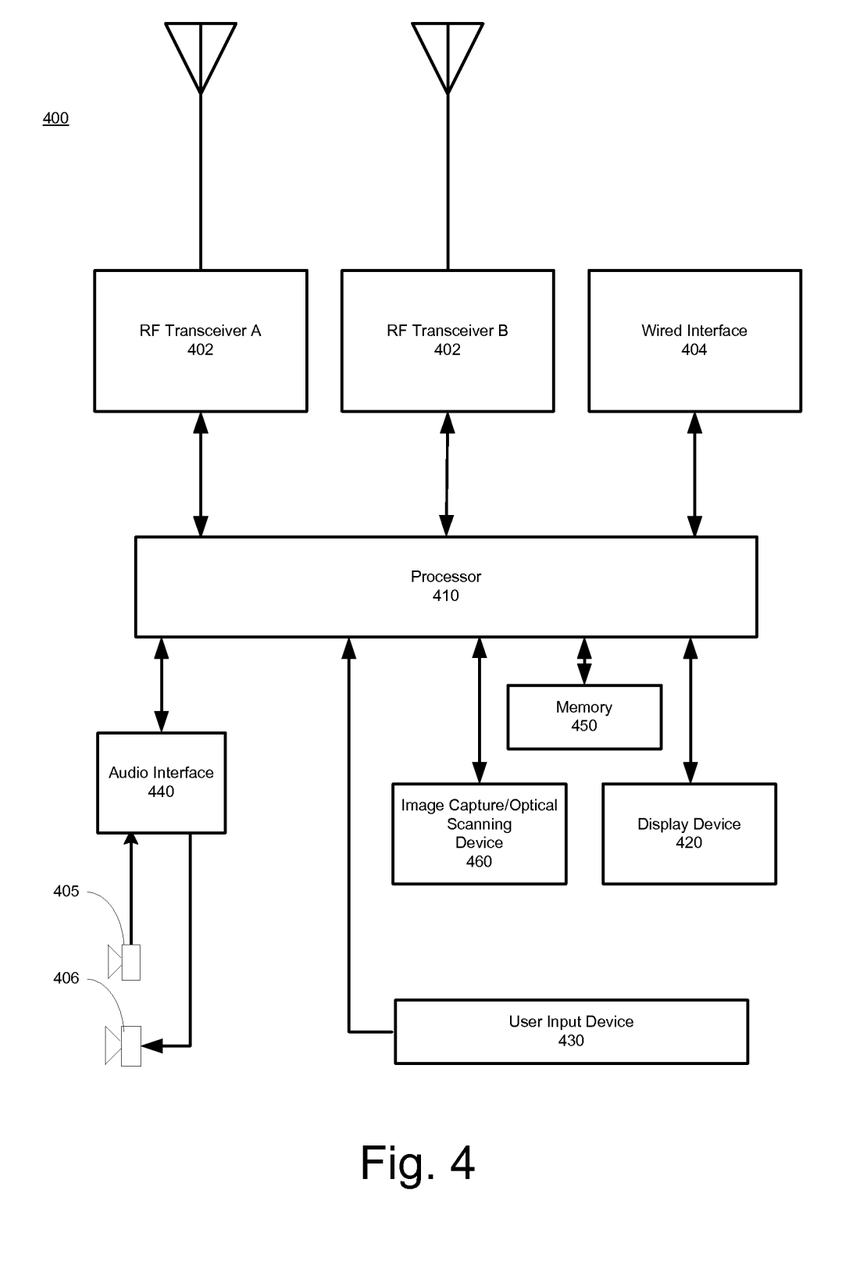
FIG. 4 is a block diagram illustrating a personal electronic device that may correspond, for example, to electronic devices shown in FIG. 1, in accordance with a representative embodiment of the present invention.

FIG. 4 is a block diagram illustrating a personal electronic device 400 that may correspond, for example, to electronic devices 20', 20', 20" shown in FIG. 1, in accordance with a representative embodiment of the present invention. The personal electronic device 400 may correspond to electronic user devices such as, by way of example and not limitation, a smart phone, a tablet computer, a cellular phone, a media player, a handheld personal computer, a laptop, a notebook computer, a net book computer, a desktop computer, a television, or any other suitable electronic device having the functionality discussed herein.

As shown in FIG. 4, the personal electronic device 400 includes a processor 410, an RF transceiver A 402, an RF transceiver B 403, a wired interface 404, a display device 420, a user input device 430, an audio interface 440, a memory 450, and an image capture/optical scanning device 460. The processor 410 may be, for example, a suitable microprocessor or microcomputer having sufficient computing power to control the personal electronic device 400, and is operably coupled to the RF transceiver A 402, the RF transceiver B 403, and the wired interface 404. The RF transceiver A 402 and RF transceiver B 403 may comprise any necessary circuitry, logic, and software/firmware for wireless communication using any of, for example, the cellular, Bluetooth, Wi-Fi (e.g., IEEE 802.11a/b/g/n/ac), Zigbee, WiMAX, Near Field Communication (NFC), radio frequency identifier (RFID), or any other wireless network air interface standard known now or in the future. The wired interface 404 may comprise any necessary circuitry, logic, and software/firmware for wired communication over any of, for example, an Ethernet, Universal Serial Bus, FireWire (IEEE 1394) or other wired networks known now or in the future.

The processor 410 is also operably coupled to the memory 450, and may be used for non-transitory storage of executable program instructions, parameters, and data for management and control of any of the circuitry of the personal electronic device 400. The display device 420 is also operably coupled to the processor 410, and may comprise, for example, one or more LED, OLED, LCD, or other suitable form of visual display capable of presenting text and/or graphics, and may comprise any circuitry, logic, or software/firmware to support, for example, a graphical user interface (GUI). The user input device 430 may comprise, for example, suitable switches, buttons, or touch sensitive surfaces to enable user control and operation of the personal electronic device 400, and may comprise any necessary circuitry, logic, and software/firmware to allow the user input device 430 to perform those functions. In a representative embodiment of the present invention, the user input device 430 may be a touch sensitive surface at the viewing side of the display device 420, enabling a user to use the touch sensitive surface of the display device to enter user inputs and respond to information displayed on the display device 420. The audio interface 440 comprises any necessary circuitry, logic, and software to interface a microphone 405 and a speaker 406 to the processor 410. The image capture/optical scanning device 460 may include, by way of example and not limitation, a monochrome or color digital imaging device, an infrared receiver, and/or a scanner capable of detecting light signals representative of bar codes (e.g., UPC), two-dimensional codes (e.g., a QR code), or other forms of optical encoding of digital information known now or in the future.

Aspects of the present invention may be seen in a method of operating a system for determining an optimal combination of offers from a plurality of offers of value available to a consumer considering purchase of one or more things. Such a method may comprise, in a computer system operable to communicate with the consumer at a location of purchase of the one or more things, receiving information identifying the consumer and information identifying the one or more things, and identifying offers of value that are applicable to each thing of the one or more things, wherein each offer of value has one or more associated rules governing use of that offer of value. The method may also comprise creating one or more groups of offers of value able to be applied together on the one or more things, in accordance with the rules associated with each offer of value of the one or more groups, and creating all possible combinations of the offers of value in each group of the one or more groups of offers of value able to be applied together on the one or more things. In addition such a method may comprise analyzing the value to the consumer of each of the possible combinations of offers of value for each of the one or more groups of offers of value, and identifying, to the consumer, one or more combinations of offers of value having the highest values to the consumer across all of the one or more groups of offers of value.

In a representative embodiment of the present invention, an offer of value may comprise one of a percentage discount coupon, a cash value coupon, a gift card, a store sale percentage discount, a store sale cash value discount, a number of points having a corresponding monetary value towards a future purchase, and a buy-X-get-Y free offer where X and Y may comprise natural numbers, and where each of the one or more things comprises one of a product and a service. Identifying, to the consumer, one or more combinations of offers of value having the highest values to the consumer across all of the one or more groups of offers of value may comprise identifying a combination of offers of value having the highest value to the consumer from each of the one or more groups of offers of value. The one or more associated rules may comprise one or more of the following: a period of time within which the associated offer of value may be used by the consumer, a range of dates within which the associated offer of value may be used by the consumer, information identifying a hierarchy of products to which the associated offer of value may be applied, information identifying other offers of value with which the associated offer of value may be combined. Communication with the consumer at a location of purchase may comprise displaying one or more offers of value based on the analysis. The communication with the consumer at a location of purchase may comprise one of the following: communication via a point of sale terminal of a merchant, communication via a personal computer of the consumer, and communication via downloadable application code installed on a handheld mobile communication device of the consumer.

Aspects of the present invention may also be found in a non-transitory computer-readable medium having a plurality of code sections. In a representative embodiment of the present invention, each code section may comprise a plurality of instructions executable by at least one processor to cause the processor to performs actions of a method of operating a computer system operable to communicate with a consumer at a location of purchase of the one or more things. The method may be for determining an optimal combination of offers from a plurality of offers of value available to the consumer considering purchase of the one or more things, and may comprise the actions of the method described above.

Additional aspects of the present invention may be observed in a system for determining an optimal combination of offers from a plurality of offers of value available to a consumer considering purchase of one or more things. Such a system may be operable to communicate with the consumer at a location of purchase of the one or more things. The system may comprise one or more processors for communicatively coupling to the consumer and to at least one repository containing one or more offers of value, each offer of value having one or more associated rules governing use of that offer of value, the one or more processors operable to, at least, execute instructions to perform the actions of the method described above.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of operating a system for determining an optimal combination of offers from a plurality of offers of value available to a consumer considering a purchase of one or more things seceded by the consumer from things for sale by a merchant, the method comprising:

in a computer system for processing consumer transactions of the merchant, the computer system comprising a memory configured to hold information identifying the things for sale by the merchant, the consumer as a particular consumer of a plurality of consumers, the plurality of offers of value and associated rules governing use of each offer of value of the plurality of offers of value with other offers of value from the plurality of offers of value and with each thing of the one or more things, the computer system operable to communicatively couple with one or more point of sale terminals of the merchant and with a mobile phone of the consumer at a location of purchase of the one or more things, wherein the computer system and the mobile phone are configured to determine an optimal combination of offers;

receiving, by the computer system, a location of the consumer via the mobile phone, wherein the mobile phone comprises a processor, a display, a graphical user interface, and a wireless transceiver, wherein the mobile phone is configured to determine the location of the consumer, and wherein the computer system is configured to maintain maps and layouts of buildings and geographic areas and determine directions or routes within the buildings and geographic areas;

retrieving, by the computer system, the plurality of offers of value based on the location of the consumer, wherein the location of the consumer is determined via the mobile phone that is configured to determine the location of the consumer;

receiving, by the computer system, data maintained on the mobile phone of the consumer;

determining, by the computer system, whether particular offers can be applied at a particular store location at which the consumer is making a purchase;

filtering, by the computer system, the plurality of offers of value based on the data maintained on the mobile phone of the consumer;

receiving, by the computer system, information identifying the consumer and information identifying the one or more things selected by the consumer for purchase;

determining, by the computer system, the most frequently purchased products or services, and the most frequently visited sales channels of the consumer;

caching, in the memory, the plurality of offers of value for one or more of the things that are associated with the most frequently purchased products or services and with the most frequently visited sales channels of the consumer, to reduce processsing by the computer system for subsequent requests for offers of value for the one or more of the things;

identifying, by the computer system and by at least accessing the offer data cached in memory, using the plurality of offers of value and the associated rules, those offers of value that are applicable to each thing of the one or more things selected by the consumer for purchase, wherein each offer of value represents something of value provided to the consumer contingent on a purchase of each thing to which the offer of value applies;

reducing, by the computer system, a number of identified offers that are applicable to the one or more things to reduce processing by the computer system;

creating, by the computer system, one or more groups of offers of value able to be applied together on the one or more things, in accordance with the rules associated with each offer of value of the one or more groups, wherein each group of the one or more groups of offers of value is grouped according to a number of offers that can be stacked and a different set of stackable offers of value;

organizing products into a multilevel hierarchical data structure, wherein the products include the things for sale;

identifying levels of the multi-level hierarchical data structure of products to which the associated offer of value may be applied, a portion of the multi-level hierarchical data structure of products which is excluded from the associated offer, and information identifying other offers of value with which the associated offer of value may be combined;

creating, by the computer system, possible combinations of the offers of value in each group of the one or more groups of offers of value able to be applied together on the one or more things;

analyzing, by the computer system, the value to the consumer of each of the possible combinations of offers of value for each of the one or more groups of offers of value, wherein processing required to analyze the possible combinations of offers of value in each group of the one or more groups is reduced, by filtering the possible combinations of offers of value according to an optimal order of application of each of the associated rules of each offer of value;

identifying, to the consumer by the computer system, one or more combinations of offers of value having the highest value to the consumer across all of the one or more groups of offers of value;

and removing one or more offers of value from the combinations of offers of value in response to a threshold number of offers of value allowed by a sales channel checkout.

2. The method according to claim 1, wherein an offer of value comprises one of a percentage discount coupon, a cash value coupon, a gift card, a store sale percentage discount, a store sale cash value discount, a number of points having a corresponding monetary value towards a future purchase, and a buy-X-get-Y free offer where X and Y comprise natural numbers.

3. The method according to claim 1, wherein each of the one or more things comprises one of a product and a service.

4. The method according to claim 1, wherein identifying, to the consumer, one or more combinations of offers of value having the highest values to the consumer across all of the one or more groups of offers of value comprises identifying a combination of offers of value having the highest value to the consumer from each of the one or more groups of offers of value.

5. The method according to claim 1, wherein the one or more associated rides comprises one or more of the following: a period of time within which the associated offer of value may be used by the consumer, and a range of dates within which the associated offer of value may be used by the consumer.

6. The method according to claim 1, wherein communication with the consumer at a location of purchase comprises displaying one or more offers of value based on the analysis.

7. The method according to claim 1, wherein the communication with the consumer at a location of purchase comprises one of the following: communication via a point of sale terminal of the merchant, communication via a personal computer of the consumer, and communication via downloadable application code installed on a handheld mobile communication device of the consumer.

8. The method according to claim 1, wherein the value to the consumer of a combination of offers of value comprises the difference between a total price of the one or more things before application of a particular combination of offers of value, and a total price of the one or more things after application of the particular combination of offers of value.

9. The method according to claim 1, wherein the optimal order eliminates the greatest number of offers of value at application of each rule.

10. A non-transitory computer-readable medium having a plurality of code sections, each code section comprising a plurality of instructions executable by at least one processor to cause the at least one processor to perform actions of a method of operating a computer system for processing consumer transactions of the merchant, the computer system comprising a memory configured to hold information identifying the things for sale by the merchant, the consumer as a particular consumer of a plurality of consumers, the plurality of offers of value and associated rules governing use of each offer of value of the plurality of offers of value with other offers of value from the plurality of offers of value and with each thing of the one or more things, the at least one processor operable to communicatively couple with one or more point of sale terminals of the merchant and a with a mobile phone of a consumer at a location of purchase of the one or more things, the method for determining an optical combination of offers from a plurality of offers of value available to the consumer considering purchase of the one or more things selected by the consumer from things for sale by a merchant, the actions comprising:

receiving, by the computer system, a location of the consumer via the mobile phone, wherein the mobile phone comprises a processor, a display, a graphical user interface, and a wireless transceiver, wherein the mobile phone is configured to determine the location of the consumer, and wherein the computer system is configured to maintain maps and layouts of buildings and geographic areas and determine directions or routes within the buildings and geographic areas, wherein the computer system and the mobile phone are configured to determine an optimal combination of offers;

retrieving, by the computer system, the plurality of offers of value based on the location of the consumer, wherein the location of the consumer is determined via the mobile phone that is configured to determine the location of the consumer;

receiving, by the computer system, data maintained on the mobile phone of the consumer;

determining, by the computer system, whether particular offers can be applied at a particular store location at which the consumer is making a purchase;

filtering, by the computer system, the plurality of offers of value based on the data maintained on the mobile phone of the consumer;

receiving, by the computer system, data maintained on one or both of a host system and a data repository;

filtering, by the computer system, the plurality of offers of value based on the data maintained on one or both of the host system and the data repository;

receiving information identifying the consumer and identifying the one or more things selected by the consumer for purchase;

determining, by the computer system, the most frequently purchased products or services, and the most frequently visited sales channels of the consumer;

caching, in the memory, the plurality of offers of value for one or more of the things that are associated with the most frequently purchased products or services and with the most frequently visited sales channels of the consumer, to reduce processing by the computer system for subsequent requests for offers of value for the one or more of the things;

identifying, by the computer system and by at least accessing the offer data cached in memory, offers of value that are applicable to each thing of the one or more things selected by the consumer for purchase, using the plurality of offers of value and the associated rules, wherein each offer of value represents something of value provided to the consumer contingent on a purchase of each thing to which the offer of value applies;

reducing a number of identified offers that are applicable to the one or more things to reduce processing by the computer system;

creating one or more groups of offers of value able to be applied together on the one or more things, in accordance with the rules associated with each offer of value of the one or more groups, wherein each group of the one or more groups of offers of value is grouped according to a number of offers that can be stacked and a different set of stackable offers of value;

organizing products into a multilevel hierarchical data structure, wherein the products include the things for sale;

identifying levels of the multi-level hierarchical data structure of products to which the associated offer of value may be applied, a portion of the multi-level hierarchical data structure of products which is excluded from the associated offer, and information identifying other offers of value with which the associated offer of value may be combined;

creating possible combinations of the offers of value in each group of the one or more groups of offers of value able to be applied together on the one or more things;

analyzing the value to the consumer of each of the possible combinations of offers of value for each of the one or more groups of offers of value, wherein processing required to analyze the possible combinations of offers of value in each group of the one or more groups is reduced, by filtering the possible combinations of offers of value according to an optimal order of application of each of the associated rules of each offer of value;

identifying, to the consumer, one or more combinations of offers of value having the highest values to the consumer across all of the one or more groups of offers of value;

and removing one or more offers of value from the combinations of offers of value in response to a threshold number of offers of value allowed by a sales channel checkout.

11. The non-transitory computer-readable medium according to claim 10, wherein an offer of value comprises one of a percentage discount coupon, a cash value coupon, a gift card, a store sale percentage discount, a store sale cash value discount, a number of points having a corresponding monetary value towards a future purchase, and a buy-X-get-Y free offer where X and Y comprise natural numbers.

12. The non-transitory computer-readable medium according to claim 10, wherein each of the one or more things comprises one of a product and a service.

13. The non-transitory computer-readable medium according to claim 10, wherein identifying, to the consumer, one or more combinations of offers of value having the highest values to the consumer across all of the one or more groups of offers of value comprises identifying a combination of offers of value having the highest value to the consumer from each of the one or more groups of offers of value.

14. The non-transitory computer-readable medium according to claim 10, wherein the one or more associated rules comprises one or more of the following: a period of time within which the associated offer of value may be used by the consumer, and a range of dates within which the associated offer of value may be used by the consumer.

15. The non-transitory computer-readable medium according to claim 10, wherein communication with the consumer at a location of purchase comprises displaying one or more offers of value based on the analysis.

16. The non-transitory computer-readable medium according to claim 10, wherein the communication with the consumer at a location of purchase comprises one of the following: communication via a point of sale terminal of the merchant, communication via a personal computer of the consumer, and communication via downloadable application code on a handheld mobile communication device of the consumer.

17. The non-transitory computer-readable medium according to claim 10, wherein the value to the consumer of a combination of offers of value comprises the difference between a total price of the one or more things before application of a particular combination of offers of value; and a total price of the one or more things after application of the particular combination of offers of value.

18. The non-transitory computer-readable medium according to claim 10, wherein the optimal order eliminates the greatest number of offers of value at application of each rule.

19. A system for determining an optimal combination of offers from a plurality of offers of value available to a consumer considering purchase of one or more things selected by the consumer from things for sale by a merchant, the system operable to communicatively couple with one or more point of sale terminals of the merchant and with a mobile phone of the consumer at a location of purchase of the one or more things, the system comprising:
one or more processors for processing consumer transactions of the merchant and for communicatively coupling to the point of sale terminals, the mobile phone of the consumer, and to a memory configured to hold information identifying the things for sale by the merchant, the consumer as a particular consumer of a plurality of consumers, the plurality of offers of value and associated rules governing use of each offer of value of the plurality of offers of value with other offers of value from the plurality of offers of value and with each thing of the one or more things, the one or more processors operable to, at least:
receive, by the computer system, a location of the consumer via the mobile phone, wherein the mobile phone comprises a processor, a display, a graphical user interface, and a wireless transceiver, wherein the mobile phone is configured to determine the location of the consumer, and wherein the computer system is configured to maintain maps and layouts of buildings and geographic areas and determine directions or routes within the buildings and geographic areas, wherein the one or more processors and the mobile phone are configured to determine an optimal combination of offers;
retrieve, by the computer system, the plurality of offers of value based on the location of the consumer, wherein the location of the consumer is determined via the mobile phone that is configured to determine the location of the consumer;
receive, by the computer system, data maintained on the mobile phone of the consumer;
determine, by the computer system, whether particular offers can be applied at a particular store location at which the consumer is making a purchase;
filter, by the computer system, the plurality of offers of value based on the data maintained on the mobile phone of the consumer;
receive, by the computer system, data maintained on one or both of a host system or a data repository;
filter, by the computer system, the plurality of offers of value based on the data maintained on one or both of the host system and the data repository;
receive information identifying the consumer and information identifying the one or more things selected by the consumer for purchase;
determine, by the computer system, the most frequently purchased products or services, and the most frequently visited sates channels of the consumer;
cache, in the memory, the plurality of offers of value for one or more of the things that are associated with the most frequently purchased products or services and with the most frequently visited sales channels of the consumer, to reduce processing by the computer system for subsequent requests for offers of value for the one or more of the things;
identify by at least accessing the offer data cached in memory, offers of value that are applicable to each thing of the one or more things selected by the consumer for purchase, using the plurality of offers of value and the associated rules, wherein each offer of value represents something of value provided to the consumer contingent on a purchase of each thing to which the offer of value applies;
reduce a number of identified offers that are applicable to the one or more things to reduce processing by the computer system;
create one or more groups of offers of value able to be applied together on the one or more things, in accordance with the rules associated with each offer of value of the one or more groups, wherein each group of the one or more groups of offers of value is grouped according to a number of offers that can be stacked and a different set of stackable offers of value;
organize products into a multi-level hierarchical data structure, wherein the products include the things for sale;
identify levels of the multi-level hierarchical data structure of products to which the associated offer of value may be applied, a portion of the multi-level hierarchical data structure of products which is excluded from the associated offer, and information identifying other offers of value with which the associated offer of value may be combined;
create possible combinations of the offers of value in each group of the one or more groups of offers of value able to be applied together on the one or more things;
analyze the value to the consumer of each of the possible combinations of offers of value for each of the one or more groups of offers of value, wherein processing required to analyze the possible combinations of offers of value in each group of the one or more groups is reduced, by filtering the possible combinations of offers of value according to an optimal order of application of each of the associated rules of each offer of value;

identify, to the consumer, one or more combinations of offers of value having the highest value to the consumer across all of the one or more groups of offers of value; and remove one or more offers of value from the combinations of offers of value in response to a threshold number of offers of value allowed by a sales channel checkout.

20. The system according to claim 19, wherein an offer of value comprises one of a percentage discount coupon, a cash value coupon, a gift card, a store sale percentage discount, a store sale cash value discount, a number of points having a corresponding monetary value towards a future purchase, and a buy-X-get-Y free offer where X and Y comprise natural numbers.

21. The system according to claim 19, wherein each of the one or more things comprises one of a product and a service.

22. The system according to claim 19, wherein identifying, to the consumer, one or more combinations of offers of value having the highest values to the consumer across all of the one or more groups of offers of value comprises identifying a combination of offers of value having the highest value to the consumer from each of the one or more groups of offers of value.

23. The system according to claim 19, wherein the one or more associated rules comprises one or more of the following: a period of time within which the associated offer of value may be used by the consumer, and a range of dates within which the associated offer of value may be used by the consumer.

24. The system according to claim 19, wherein communication with the consumer at a location of purchase comprises displaying one or more oilers of value based on the analysis.

25. The system according to claim 19, wherein the communication with the consumer at the location of purchase comprises one of the following: communication via a point of sale terminal of the merchant, communication via a personal computer of the consumer, and communication via downloadable application code installed on a handheld mobile communication device of the consumer.

26. The system according to claim 19, wherein the value to the consumer of a combination of offers of value comprises the difference between a total price of the one or more things before application of a particular combination of offers of value, and a total price of the one or more things after application of the particular combination of offers of value.

27. The system according to claim 19, wherein the optimal order eliminates the greatest number of offers of value at application of each rule.

* * * * *